(12) United States Patent
Kondo

(10) Patent No.: US 8,355,068 B2
(45) Date of Patent: Jan. 15, 2013

(54) SOLID-STATE IMAGE SENSING DEVICE, ANALOG-DIGITAL CONVERSION METHOD OF SOLID-STATE IMAGE SENSING DEVICE, AND ELECTRONIC APPARATUS

(75) Inventor: Hiroyasu Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 329 days.

(21) Appl. No.: 12/801,593

(22) Filed: Jun. 16, 2010

(65) Prior Publication Data

US 2011/0025900 A1 Feb. 3, 2011

(30) Foreign Application Priority Data

Aug. 3, 2009 (JP) ................................. 2009-180374

(51) Int. Cl.
*H04N 3/14* (2006.01)
(52) U.S. Cl. ...................................................... 348/308
(58) Field of Classification Search .................... 348/308
See application file for complete search history.

(56) References Cited

U.S. PATENT DOCUMENTS

| 2009/0128678 | A1* | 5/2009 | Kitami et al. ................. | 348/308 |
| 2009/0225211 | A1* | 9/2009 | Oike ............................. | 348/308 |

FOREIGN PATENT DOCUMENTS

JP 2005-278135 10/2005

\* cited by examiner

*Primary Examiner* — Sinh Tran
*Assistant Examiner* — Christopher K Peterson
(74) *Attorney, Agent, or Firm* — Rader Fishman & Grauer, PLLC

(57) ABSTRACT

A solid-state image sensing device includes: a pixel array unit including pixels arranged in a matrix and a vertical signal line wired with respect to each pixel column; an analog-digital conversion circuit provided with respect to each pixel column and having a comparator using an analog signal as a comparison target input and a counter measuring a time from start to completion of the comparison of the comparator; a reference signal generating unit that generates reference signals with ramp waveforms; a first switch that, in a thinning readout mode, shorts the vertical signal line belonging to one pixel column of a specific group of pixel columns and the vertical signal line belonging to another group of pixel columns from which no signals are readout; and a second switch that, in the thinning readout mode, provides the reference signals to the comparator belonging to the one pixel column and the comparator belonging to the another group, respectively.

8 Claims, 9 Drawing Sheets

SOLID-STATE IMAGE SENSING DEVICE, ANALOG-DIGITAL CONVERSION METHOD OF SOLID-STATE IMAGE SENSING DEVICE, AND ELECTRONIC APPARATUS

BACKGROUND OF THE INVENTION

1. Field of the Invention

The present invention relates to a solid-state image sensing device, an analog-digital conversion method of the solid-state image sensing device, and an electronic apparatus. Specifically, an X-Y address-type solid-state image sensing device represented by a CMOS (including MOS) image sensor, an analog-digital conversion method, and an electronic apparatus.

2. Description of the Related Art

An imaging apparatus such as a digital still camera that converts light into electric signals and outputs image signals uses a solid-state image sensing device as its image capture unit (photoelectric conversion unit). In the field of the solid-state image sensing device, recently, with the larger number of pixels and the higher frame rate, technologies of realizing faster readout and lower power consumption have been indispensable.

As a kind of solid-state image sensing device, there is a CMOS (including MOS)-type image sensor (hereinafter, referred to as "CMOS image sensor") having a feature that the sensor may be manufactured in the same process as that of a CMOS integrated circuit. The CMOS image sensor has a configuration that converts charge into an electric signal with respect to each pixel and processes the electric signals read out from the pixels in parallel with respect to each pixel column. The parallel processing with respect to each pixel column can improve the readout speed of the pixel signals.

In related art, as a CMOS image sensor that reads out signals from plural pixels arranged in a matrix in parallel with respect to each pixel column, one using a column AD conversion system that performs analog-digital conversion (hereinafter, referred to as "AD conversion") on pixel signals with respect to each pixel column is known (for example, see JP-A-2005-278135).

The column AD conversion system CMOS image sensor has a configuration that shares signal readout lines in the vertical direction of the pixels two-dimensionally arranged in a matrix (hereinafter, referred to as "vertical signal lines"), and includes an AD conversion circuit and a readout circuit with respect to each pixel column. Further, the sensor performs simultaneous signal processing worth the total number of the pixel columns by driving the AD conversion circuits and the readout circuits at the same time.

The AD conversion circuit performs AD conversion by the following series of circuit operation. That is, first, the circuit compares the analog pixel signal read out from the pixel through the vertical signal line to the reference signal with a slope waveform having a certain gradient and linearly changing with respect to each pixel column using a comparator, and, at the same time, starts a count operation of a counter. In this regard, the counter performs the count operation in synchronization with clocks having a fixed period.

Then, the AD conversion circuit stops the count operation of the counter with inversion timing of the output of the comparator when the analog pixel signal and the reference signal intersect. The final count value of the counter is a digital signal according to the magnitude of the analog pixel signal. As described above, the column AD conversion system is a readout system characterized by high-speed imaging for AD conversion of pixel signals for one row at a time.

SUMMARY OF THE INVENTION

Recently, the demand for high-speed imaging has been increasingly higher. In the column AD conversion system CMOS image sensor, the frame rate is improved by reducing the number of vertical readouts (number of rows/number of lines) for realization of the high-speed imaging. Here, as a method of reducing the number of vertical readouts, for example, there are vertical thinning readout of skipping pixel rows in a fixed row period and line interlace such as vertical clipping of reading out signals of pixels in a specified region in the vertical direction. However, when the number of vertical readouts is reduced for the improvement of the frame rate, a problem that the angle of view in the longitudinal (vertical) direction is reduced and the imaged image becomes laterally longer arises.

Therefore, it is desirable to provide a solid-state image sensing device that can improve the frame rate while maintaining the longitudinal and lateral balance of the imaged image, an analog-digital conversion method, and an electronic apparatus having the solid-state image sensing device.

A solid-state image sensing device according to an embodiment of the invention including a pixel array unit in which pixels containing photoelectric conversion devices are arranged in a matrix and a vertical signal line is wired with respect to each pixel column, an analog-digital conversion circuit provided with respect to each pixel column of the pixel array unit and having a comparator using an analog signal supplied from the pixel through the vertical signal line as a comparison target input and a counter that measures a time from start of comparison to completion of the comparison of the comparator, and a reference signal generating unit that generates plural reference signals with ramp waveforms, wherein, in a thinning readout mode of reading out signals from pixels of a specific group of pixel columns of the pixel array unit to the vertical signal line, the vertical signal line belonging to one pixel column of the specific group of pixel columns and the vertical signal line belonging to another group of pixel columns than the specific group of pixel columns from pixels of which no signals are readout are shorted, and the plural reference signals as comparison criterion inputs to the comparator belonging to the one pixel column and the comparator belonging to the another group of pixel columns than the specific group of pixel columns are provided, respectively.

In the thinning readout mode of reading out signals from pixels of the specific group of pixel columns of the pixel array unit to the vertical signal line, i.e., in a horizontal thinning readout mode, no signals are read out from the pixels of the another group of pixel columns than the specific group of pixel columns to the vertical signal line. Therefore, by providing the horizontal thinning readout mode and reducing the pixel information in the horizontal direction by the horizontal thinning readout, the frame rate can be improved. Especially, by combining the horizontal thinning readout with known vertical thinning readout, vertical clipping, or the like and appropriately setting the thinning rate, longitudinal and lateral balance of the imaged image can be maintained.

Further, since the AD conversion time can be shortened by providing plural reference signals to the comparator belonging to one pixel column of the specific group of pixel columns and the comparator belonging to the another group of pixel columns than the specific group of pixel columns and performing parallel processing on the comparison operations using the comparators, the frame rate can be further improved. Especially, in the parallel processing on the comparison operations, the comparator belonging to the pixel column from which no signals are readout are used, and, as the comparators, one comparator is necessary for one pixel column, and the circuit size and the circuit area do not become larger.

According to the embodiment of the invention, by providing the horizontal thinning readout mode and combining the horizontal thinning readout with known vertical thinning readout, vertical clipping, or the like, the frame rate can be improved while the longitudinal and lateral balance of the imaged image can be maintained.

DESCRIPTION OF PREFERRED INVENTION

Hereinafter, modes for implementing the invention (hereinafter, referred to as "embodiments") will be explained in detail with reference to the drawings. The explanation will be made in the following order.

1. Solid-state Image Sensing Device to which the Invention is Applied (example of CMOS image sensor)
  1-1. System configuration
  1-2. Circuit configuration of unit pixel
2. Embodiments
  2-1. System configuration
  2-2. All-pixel readout mode
  2-3. Horizontal thinning readout mode
  2-3-1. Working example 1
  2-3-2. Working example 2
  2-4. Advantages of embodiments
3. Reference Example (example of AD conversion circuit having two comparators with respect to each pixel)
4. Modified Examples
5. Electronic Apparatus (example of imaging apparatus)

<1. Solid-State Image Sensing Device to Which the Invention is Applied>
[1-1. System Configuration]

Figure 1:
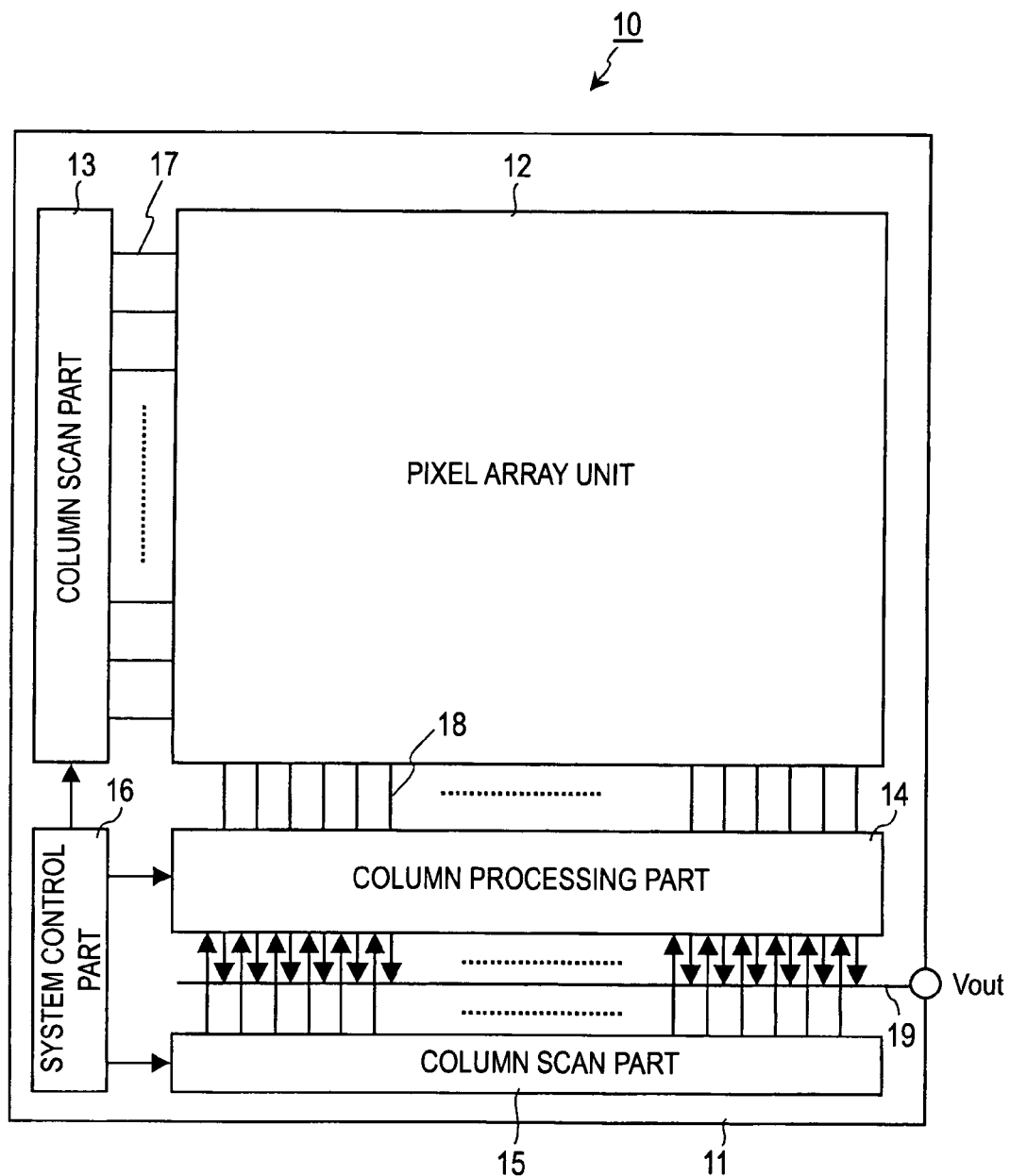
FIG. 1 is a system configuration diagram showing a schematic system configuration of a CMOS image sensor to which an embodiment of the invention is applied.

FIG. 1 is a system configuration diagram showing a schematic system configuration of a solid-state image sensing device to which an embodiment of the invention is applied, for example, a CMOS image sensor as a kind of X-Y address-type solid-state image sensing device. Here, the CMOS image sensor refers to an image sensor made by application or partial use of the CMOS process.

The CMOS image sensor 10 according to the application example has a pixel array unit 12 formed on a semiconductor substrate (hereinafter, may be referred to as "chip") 11, and a peripheral circuit unit integrated on the chip 11 where the pixel array unit 12 is formed. In this example, as the peripheral circuit unit, for example, a row scan part 13, a column processing part 14, a column scan part 15, and a system control part 16 are provided.

In the pixel array unit 12, unit pixels (hereinafter, may be simply referred to as "pixels") having photoelectric conversion devices that generate and internally accumulate photoelectric charge in an amount of charge in response to the amount of incident light are two-dimensionally arranged in a matrix. The specific configuration example of the unit pixel will be described later.

In the pixel array unit 12, further, pixel drive lines 17 are wired along the horizontal direction/row direction (the arrangement direction of the pixels in the pixel rows) with respect to each pixel row of the pixel arrangement in the matrix and vertical signal lines 18 are wired along the vertical direction/column direction (the arrangement direction of the pixels in the pixel columns) with respect to each pixel column. The pixel drive lines 17 transmit drive signals that perform driving for reading out signals from pixels. In FIG. 1, the pixel drive lines 17 is shown as one wire, however, not limited to one. One end of the pixel drive line 17 is connected to the output terminal corresponding to each row of the row scan part 13.

The row scan part 13 is a pixel drive part including a shift resistor, address decoder, etc., for driving the respective pixels of the pixel array unit 12, all pixels at the same time or in units of rows, or the like. The specific configuration of the row scan part 13 is omitted in the drawings, however, the part generally includes two scanning systems of a readout scanning system and a sweep-out scanning system.

The readout scanning system sequentially and selectively scans the unit pixels of the pixel array unit 12 in units of rows to readout signals from the unit pixels. The signal read out from the unit pixel is an analog signal. The sweep-out scanning system performs sweep-out scanning on the read out row to be readout scanned by the readout scanning system prior to the readout scanning by the time of a shutter speed.

Unnecessary charge is swept out from the photoelectric conversion devices of the unit pixels in the readout rows by the sweep-out scanning using the sweep-out scanning system, and thereby, the photoelectric conversion devices are reset. Then, the so-called electronic shutter operation is performed by sweeping out (resetting) the unnecessary charge by the sweep-out scanning system. Here, the electronic shutter operation refers to an operation of discarding photoelectric charge of the photoelectric conversion devices and newly starts exposure (starts accumulation of photoelectric charge).

The signal readout by the readout operation by the readout scanning system corresponds to an amount of light entering after the readout operation or the electronic shutter operation immediately before. Further, the period from the readout timing by the readout operation or the sweep-out timing by the electronid shutter operation immediately before to the readout timing by this readout operation is an accumulation period (exposure period) of photoelectric charge in the unit pixel.

The signals output from the respective unit pixels selected and scanned by the row scan part 13 are supplied to the column processing part 14 through the respective vertical signal lines 18. The column processing part 14 performs predetermined signal processing on the signals output through the vertical signal lines 18 from the respective pixels in the selected rows by the row scan part 13 with respect to each pixel column of the pixel array unit 12, and temporarily holds the pixel signals after signal processing.

Specifically, the column processing part 14 receives the signals of the unit pixels and performs signal processing of noise removal by CDS (Correlated Double Sampling), signal amplification, AD (analog-digital) conversion, etc., for example, on the signals.

The noise removal processing by the CDS is performed by taking a difference between the reset level read out when the unit pixels (practically, the floating diffusion part, which will be described later) are read out and the signal level read out in response to the signal charge photoelectrically converted by the photoelectric conversion devices. By the noise removal processing, the reset noise and the fixed pattern noise inherent to the pixels such as variations in the threshold values of amplification transistors are removed. Note that the signal processing exemplified here is only an example and the signal processing is not limited to that.

The column scan part 15 includes a shift resistor, address decoder, etc. and sequentially selects unit circuits corresponding to the pixel columns of the column processing part 14. By the selective scanning using the column scan part 15, the pixel signals signal-processed in the column processing part 14 are sequentially output to a horizontal bus 19 and transmitted to the outside of the chip 11 through the horizontal bus 19.

The system control part 16 receives the clocks provided from the outside of the chip 11 and data commanding the operation modes, and outputs data of internal information of the CMOS image sensor 10 and the like. The system control part 16 further has a timing generator that generates various timing signals and performs drive control of the peripheral circuit unit of the row scan part 13, the column processing part 14, the column scan part 15, etc. based on the various timing signals generated by the timing generator.

[1-2. Circuit Configuration of Unit Pixel]

Figure 2:
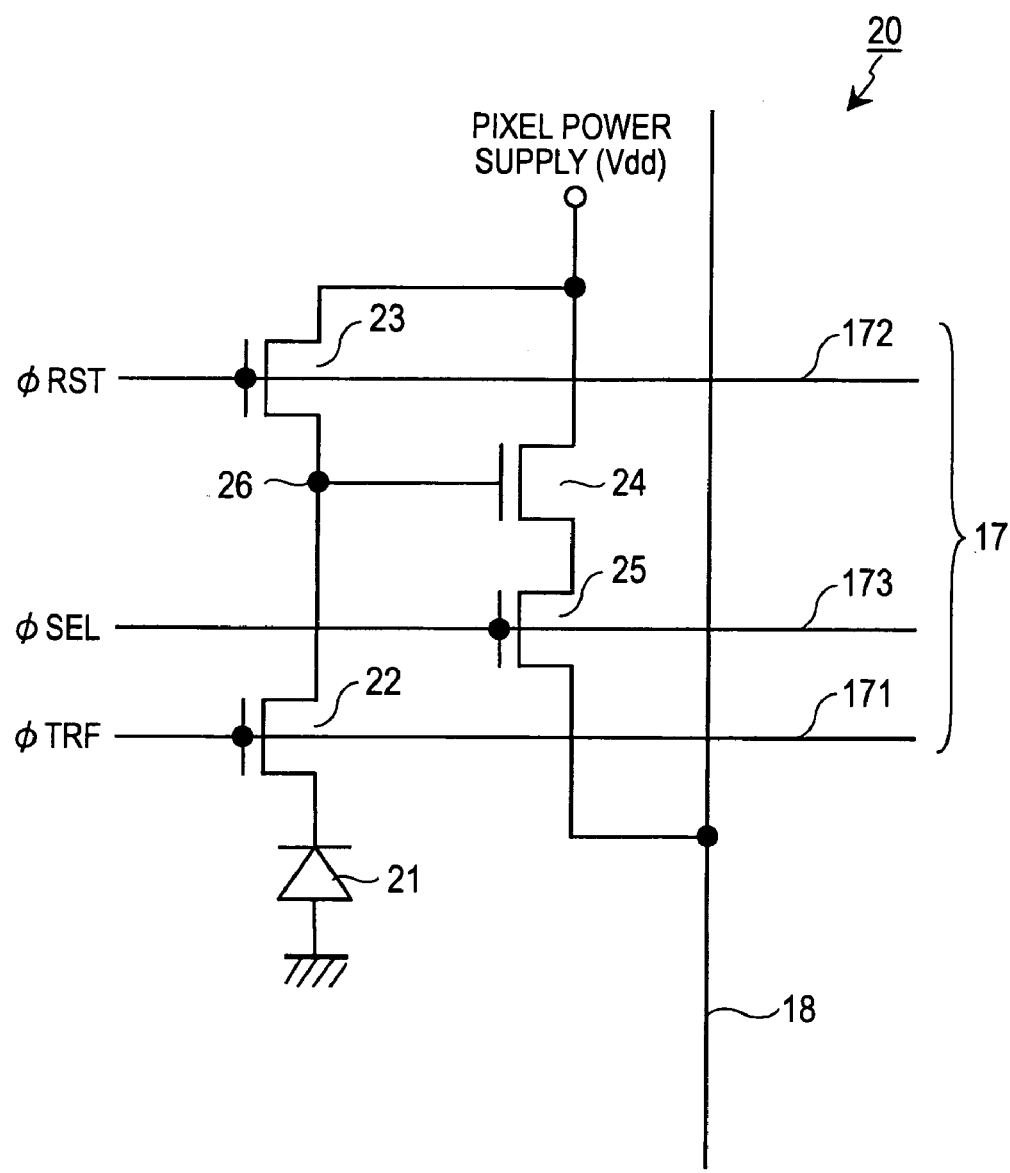
FIG. 2 is a circuit diagram showing an example of a circuit configuration of a unit pixel.

FIG. 2 is a circuit diagram showing an example of a circuit configuration of a unit pixel 20. As shown in FIG. 2, the unit pixel 20 according to the circuit example has, for example, four transistors of a transfer transistor 22, a reset transistor 23, an amplification transistor 24, and a selection transistor 25 in addition to a photodiode 21, for example, as a photoelectric conversion part.

Here, as the four transistors 22 to 25, for example, N-channel MOS transistors are used. Note that the combination of conductivity types of the transfer transistor 22, the reset transistor 23, the amplification transistor 24, and the selection transistor 25 exemplified here is only an example, and not limited to the combination.

For the unit pixel 20, as the pixel drive line 17, for example, three drive wires of a transfer line 171, a reset line 172, and a selection line 173 are provided in common with respect to each pixel of the same pixel row. The respective one ends of these transfer line 171, reset line 172, and selection line 173 are connected to the output terminal corresponding to each pixel row of the row scan part 13 in units of pixel rows, and transmits a transfer pulse φTRF, a reset pulse φRST, and a selection pulse φSEL as drive signals for driving the pixel 20.

The photodiode 21 has an anode electrode connected to the negative side power supply (e.g., ground) and photoelectrically converts received light into photoelectric charge (here, photoelectrons) in the amount of charge in response to the amount of light and accumulates the photoelectric charge. The cathode electrode of the photodiode 21 is electrically connected to the gate electrode of the amplification transistor 24 via the transfer transistor 22. A node 26 electrically connected to the gate electrode of the amplification transistor 24 is called an FD (floating diffusion) part.

The transfer transistor 22 is connected between the cathode electrode of the photodiode 21 and the FD part 26. To the gate electrode of the transfer transistor 22, the transfer pulse φTRF in which the high level (e.g., the Vdd level) is active (hereinafter, referred to as "High-active") is provided via the transfer line 171. Thereby, the transfer transistor 22 is turned on, and the photoelectric charge photoelectrically converted in the photodiode 21 is transferred to the FD part 26.

The reset transistor 23 has a drain electrode connected to the pixel power supply Vdd and a source electrode connected to the FD part 26, respectively. To the gate electrode of the reset transistor 23, the High-active reset pulse φRST is provided via the reset line 172. Thereby, the reset transistor 23 is turned on, and the charge of the FD part 26 is discarded to the pixel power supply Vdd for resetting of the FD part 26.

The amplification transistor 24 has a gate electrode connected to the FD part 26 and a drain electrode connected to the pixel power supply Vdd, respectively. Further, the amplification transistor 24 outputs the potential of the FD part 26 after resetting by the reset transistor 23 as a reset signal (reset level). The amplification transistor 24 further outputs the potential of the FD part 26 after transfer of the signal charge by the transfer transistor 22 as a light accumulation signal (signal level).

The selection transistor 25 has a drain electrode connected to the source electrode of the amplification transistor 24 and a source electrode connected to the vertical signal line 18, respectively, for example. To the gate electrode of the selection transistor 25, the High-active selection pulse φSEL is provided to the gate electrode of the selection transistor 25 via the selection line 173. Thereby, the selection transistor 25 is turned on, and the unit pixel 20 is turned into the selected state and the signal output from the amplification transistor 24 is relayed to the vertical signal line 18.

A circuit configuration in which the selection transistor 25 is connected between the pixel power supply Vdd and the amplification transistor 24 may be employed.

Further, the unit pixel 20 is not limited to one having the pixel configuration including the four transistors having the above described configurations. For example, a pixel configuration including three transistors among which one transistor serves as the amplification transistor 24 and the selection transistor 25 or any configuration of the pixel circuit may be employed.

<2. Embodiments>

[2-1. System Configuration]

Figure 3:
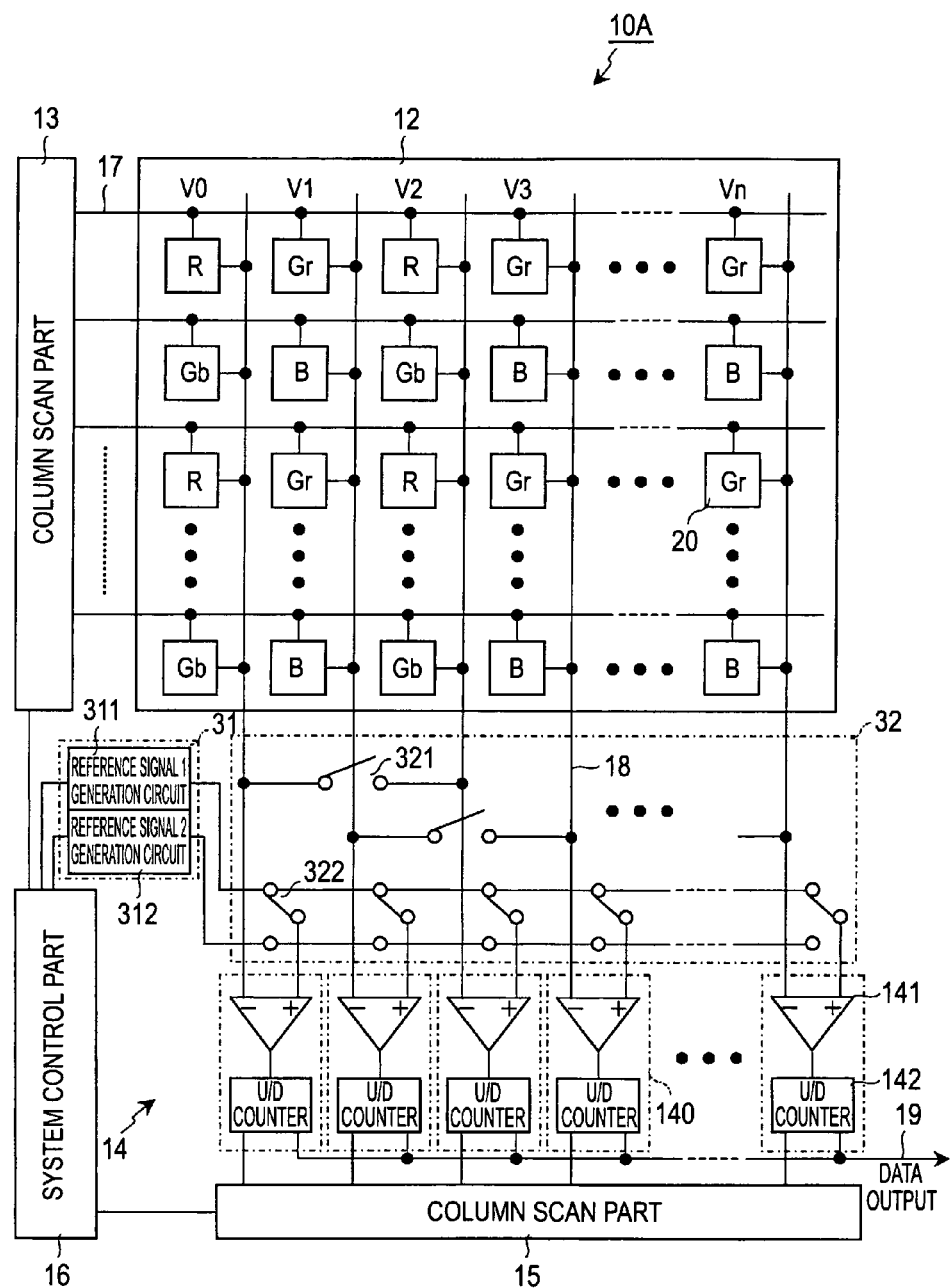
FIG. 3 is a system configuration diagram showing a schematic system configuration of a CMOS image sensor according to one embodiment of the invention.

FIG. 3 is a system configuration diagram showing a schematic system configuration of a solid-state image sensing device according to one embodiment of the invention, for example, a CMOS image sensor as a kind of X-Y address-type solid-state image sensing device. In FIG. 3, the same signs are assigned to equal parts (corresponding parts) to those in FIG. 1, and their overlapping detailed explanation will be omitted.

As shown in FIG. 3, the CMOS image sensor 10A according to the embodiment includes a reference signal generating part 31 and a switch part 32 in addition to the pixel array unit 12, the row scan part 13, the column processing part 14, the column scan part 15, and the system control part 16. Further, color filters of RGB Bayer arrangement, for example, are provided in the respective pixels 20 of the pixel array unit 12. Here, in the RGB Bayer arrangement, greens (G) are arranged in a checkered pattern, and reds (R) and blues (blue) are arranged in checkered patterns in the remaining part.

The CMOS image sensor 10A according to the embodiment adopts a column AD conversion system that AD-converts the analog pixel signals into digital signals with respect to each pixel column of the pixel array unit 12. That is, the column processing part 14 includes an AD conversion circuit 140 with a circuit configuration having at least a comparator 141 and a counter 142 as a unit circuit, and the AD conversion circuit 140 is provided in one-to-one relation to the pixel column of the pixel array unit 12. It may be possible that the AD conversion circuit 140 employs a configuration having a memory for holding the count value of the counter 142 at the downstream of the counter 142.

The reference signal generating part 31 includes a DA (digital-analog) conversion circuit, for example, and a plurality of reference signals with a ramp waveform having a certain gradient and linearly changing, i.e., reference signals for converting the change of the voltage into the change of time. In the case of the example, the reference signal generating part 31 includes two generation circuits of a reference signal 1 generation circuit 311 and a reference signal 2 generation circuit 312, for example, and generates two different reference signals 1, 2. The details of the two different reference signals 1, 2 will be described later.

In the switch part 32, two channels of switches 321, 322 are provided. The switch 321 is connected between the two vertical signal lines 18 belonging to the pixel columns of the pixels 20 in the same color in response to the two different reference signals 1, 2, and appropriately short the two vertical signal lines 18. In the case of the CMOS image sensor 10A according to the embodiment, in the pixel array unit 12, RG pixel columns V0, V2, . . . , Vn−1 in which R pixels and G (Gb) pixels are alternately arranged in the column direction and GB pixel columns V1, V3, . . . , Vn in which G (Gr) pixels and B pixels are alternately arranged in the column direction are alternately arranged.

For the arrangement of the RG pixel columns and the GB pixel columns, in units of adjacent two vertical signal lines 18, 18 belonging to the RG pixel columns V0, V2, . . . , Vn−1, the switches 321 are connected between the two vertical signal lines 18. Similarly, in units of adjacent two vertical signal lines 18, 18 belonging to the BG pixel columns V1, V3, . . . , Vn, the switches 321 are connected between the two vertical signal lines 18.

The switch 322 is provided with respect to each column of the pixel array unit 12, and, with the two reference signals 1, 2 generated in the reference signal generating part 31 as two inputs, selects one of the reference signals and supplies it as a comparison criterion input to one input terminal (e.g., non-inverted input terminal) of the comparator 141. The switching control of the switches 311, 312 of the switch part 32 is executed under the control of the system control part 16.

In the AD conversion circuit 140, the comparator 141 uses the reference signal 1 or the reference signal 2 alternatively provided as a comparison criterion input through the switch 322 as one input (e.g., non-inverted input) and the analog pixel signal provided as a comparison target input through the vertical signal line 18 as the other input (e.g., inverted input). Further, the comparator 141 compares the analog pixel signal as the comparison target input to the reference signal 1 or the reference signal 2 as the comparison criterion input with respect to each pixel column. At the same time with the start of comparison, the counter 142 starts a count operation. The counter 142 includes an up (U)/down (D) counter, for example, and performs the count operation in synchronization with clocks having a fixed period.

When the analog pixel signal intersects with (becomes equal to) the reference signal 1 or the reference signal 2, the polarity of the output of the comparator 141 is reversed. The counter 142 stops the count operation with polarity reversal timing of the output of the comparator 141. That is, the counter 142 measures a time from the start of the comparison to the completion of the comparison of the comparator 141. Further, the final count value of the counter 142 is digital data (pixel data) representing the magnitude of the analog pixel signal by time information. The digital data is sequentially read out by column scanning by the column scan part 15 to the horizontal bus 19 through horizontal scan switches (not shown) that sequentially turn on in synchronization with the column scanning.

The CMOS image sensor 10A according to the above described embodiment is characterized in the following three points. The first point is that the sensor has the switches 321 that short two vertical signal lines 18 belonging to the pixel columns of the pixels 20 in the same colors. The second point is that the sensor uses plural different reference signals, e.g., the two different reference signals 1, 2 as the reference signals of the comparator 141. The third point is that the sensor has the switches 322 that select and provide one of the two different reference signals 1, 2 to the comparators 141.

The switches 321 are off (opened) in an all-pixel readout mode of reading out signals from all of the respective pixels 20 in the pixel array unit 12. On the other hand, in a horizontal thinning readout mode of performing horizontal readout processing of reading out signals only from the pixels of a predetermined pixel column, but not reading out signals from the pixels of the remaining pixel columns, the switches 321 are on (closed) under the control by the system control part 16.

[2-2. All-Pixel Readout Mode]

In the all-pixel readout mode, the switches 321 are off, and the switches 322 belonging to all pixel columns select the reference signal 1. The reference signal 1 used for AD conversion in the all-pixel readout mode is a signal with a ramp waveform that falls from the maximum value to the minimum value at a fixed angle. The width between the maximum value and the minimum value is a dynamic range of the reference signal 1 and the dynamic range is determined in response to the minimum value (black level) and the maximum value (white level/saturated level).

Figure 4:
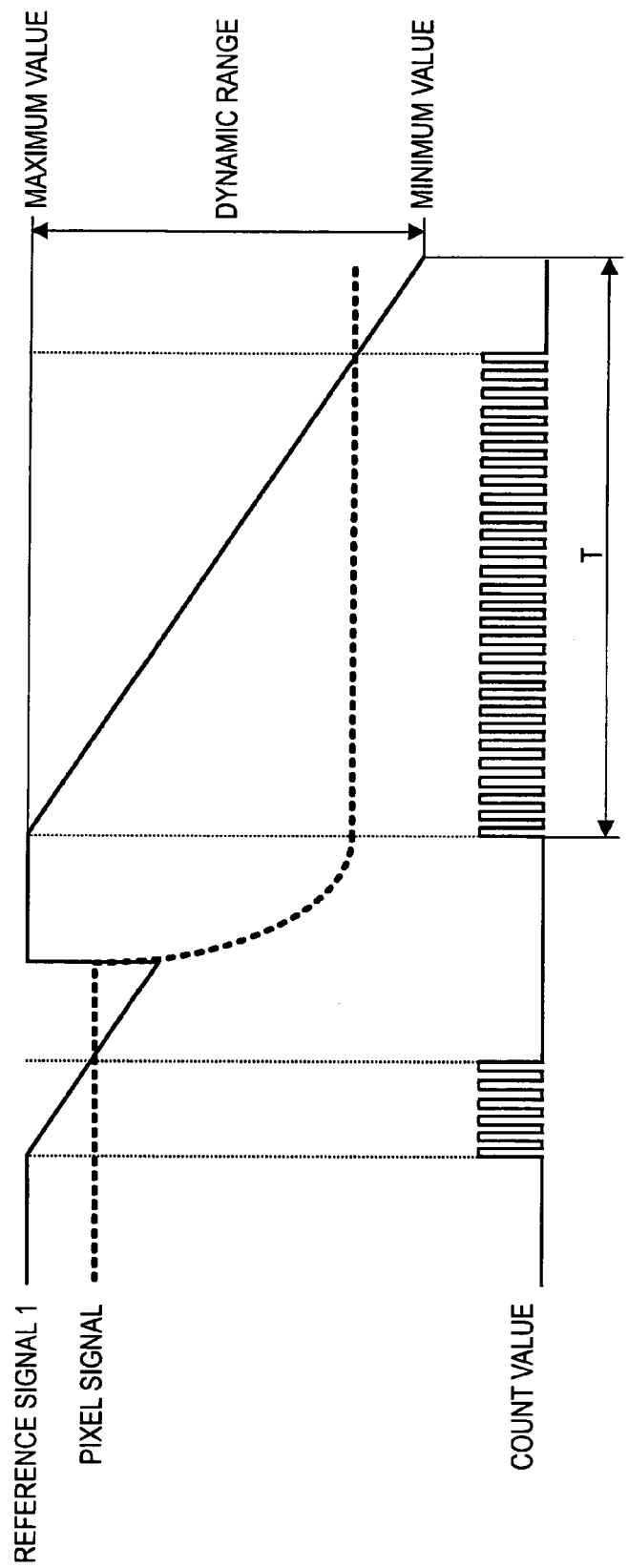
FIG. 4 is a timing waveform chart for explanation of an AD conversion operation in an all-pixel readout mode.

Here, an AD conversion operation in the all-pixel readout mode will be explained using a timing waveform chart of FIG. 4.

In a certain selected row, after the first readout operation from the unit pixel 20 to the vertical signal line 18 becomes stable, the reference signal 1 is provided from the reference signal 1 generation circuit 311 to the comparator 141 via the switch 322. Then, in the comparator 141, the comparison operation between the signal provided through the vertical signal line 18 and the reference signal 1 is started. At the same time with the start of the comparison operation, the counter 142 starts down-count, for example.

In the first readout operation, the reset level (P-phase level) of the unit pixel 20 is read out. The reset level includes fixed pattern noise that varies depending on the unit pixel 20 as an offset. Further, in the first comparison operation, when the reset level provided through the vertical signal line 18 and the reference signal 1 are equal (intersect), the polarity of the output of the comparator 141 is reversed. In response to the reversed output of the comparator 141, the counter 142 stops the down-count. In this regard, the count value of the counter 142 is a value representing the magnitude of the reset level.

In the second readout operation, the signal level (so-called D-phase level) in response to the amount of incident light with respect to each unit pixel 20 is read out in addition to the reset level by the operation similar to that of the first readout. That is, in a certain selected row, after the second readout operation from the unit pixel 20 to the vertical signal line 18 becomes stable, the reference signal 1 is provided from the reference signal 1 generation circuit 311 to the comparator 141 via the switch 322. Then, in the comparator 141, the comparison operation between the signal provided through the vertical signal line 18 and the reference signal 1 is started.

At the same time with the start of the second comparison operation, the counter 142 starts the second count operation. In the second count operation, the counter 142 performs up-count from the first count value, i.e., the count value representing the magnitude of the reset level. Further, in the second comparison operation, when the reset level provided through the vertical signal line 18 and the reference signal 1 are equal, the polarity of the output of the comparator 141 is reversed. In response to the reversed output of the comparator 141, the counter 142 stops the up-count. In this regard, the count value of the counter 142 is a value representing the magnitude of the reset level.

By the above described two readout operations, comparison operations, and count operations, the pure signal level from which the noise level has been removed is converted (AD-converted) into a digital value. Specifically, in the counter 142, the down-count is performed on the noise level in the first count operation, and the up-count is performed on the signal level from the final count value of the down-count in the second count operation.

That is, the down/up-count by the counter 142, a calculation operation of (signal level including noise level)−(noise level) is performed, and thereby, AD conversion is performed on the pure signal level from which the noise level has been removed. Further, by sequentially repeating the above described series of operations with respect to each pixel row, signals are read out from all of the respective pixels 20 of the pixel array unit 12, and, as a result, a high-resolution two-dimensional image is generated.

[2-3. Horizontal Thinning Readout Mode]

Next, an AD conversion operation in the horizontal thinning readout mode of performing reading out of signals only from the pixels of a predetermined pixel column will be explained. In the horizontal thinning readout mode in the CMOS image sensor 10A according to the embodiment, two pixels are thinned and signals of two pixels are read out among horizontal four pixels. Thereby, the amount of information of pixels in the horizontal direction becomes ½.

Figure 5:
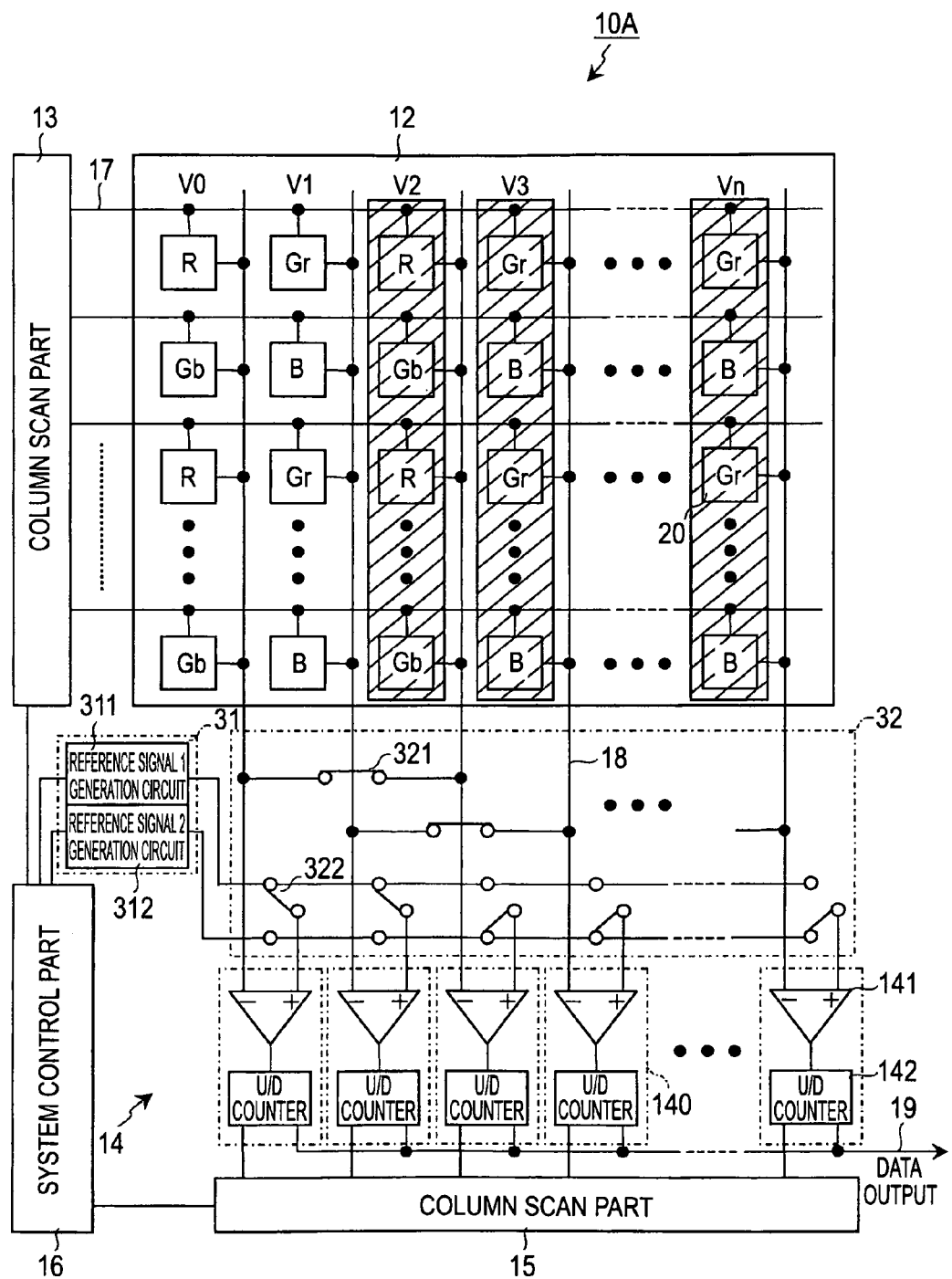
FIG. 5 shows connection relations of respective switches of a switch unit in a horizontal thinning readout mode.

In the CMOS image sensor 10A according to the embodiment, to readout only the signals of the two pixels among horizontal four pixels, regarding the pixels of two pixel columns shown by shaded areas in FIG. 5, the selection transistors 25 in FIG. 2 are turned off and electrically separated from the vertical signal lines 18. Here, for example, among four pixel columns V0 to V3, the selection transistors 25 of the respective pixels of the pixel columns V2, V3 are turned off and electrically separated from the vertical signal lines 18. Further, regarding the respective pixels of the remaining two pixel columns V0, V1, the selection transistors 25 are turned on and electrically connected to the vertical signal lines 18.

Here, as has been explained regarding the CMOS image sensor 10 shown in FIG. 1, the scanning by the row scan part 13 is executed in units of rows through the selection lines 173 shown in FIG. 2. That is, on/off control of the selection transistors 25 is performed through one selection line 173 with respect to each pixel row. On the other hand, in the case of the CMOS image sensor 10A according to the embodiment, it is necessary that, even in the same pixel row, both pixels with off-state selection transistors 25 and pixels with on-state selection transistors 25 exist. To realize this, the selection line 173 is provided in two channels with respect to each pixel row.

With four pixel rows as a unit, when the respective pixels of two pixel columns are electrically separated from the vertical signal lines 18, all of the switches 321 in the switch part 32 are turned on. For example, in the unit of four pixel columns V0 to V3, when the switches 321 are turned on, the vertical signal lines 18, 18 belonging to the pixel columns in the same colors, RG pixel columns V0, V2 in this example, are shorted by the switches 321.

In the horizontal thinning readout mode, as the reference signal to be provided to the comparators 141, the reference signal 2 is used in addition to the reference signal 1. The switches 322 corresponding to the pixel columns V0, V1 select the reference signal 1 generated in the reference signal 1 generation circuit 311 and supply the signal to the comparators 141. Further, the switches 322 corresponding to the pixel columns V2, V3 with pixels electrically separated from the vertical signal lines 18 select the reference signal 2 generated in the reference signal 2 generation circuit 312 and supply the signal to the comparators 141.

The reference signal 1 is basically the same as the reference signal 1 used in the all-pixel readout mode. However, the dynamic range (the width between the maximum value and the minimum value) is ½. The reference signal 2 is a reference signal different from the reference signal 1. Because of the waveform difference of the reference signal 2, the AD conversion operation becomes different. As below, AD conversion operations according to two working examples because of the waveform difference of the reference signal 2 will be explained.

In the horizontal thinning readout mode, like in the all-pixel readout mode, first, the noise level (P-phase level) is read out and AD conversion is performed, and then, noise is removed while the signal level (D-phase level) is readout and AD conversion is performed. Note that, in the horizontal thinning readout mode explained as below, the operation in the case of reading out the signal level (D-phase level) and performing AD conversion will be centered in explanation.

[2-3-1. Working Example 1]

Figure 6:
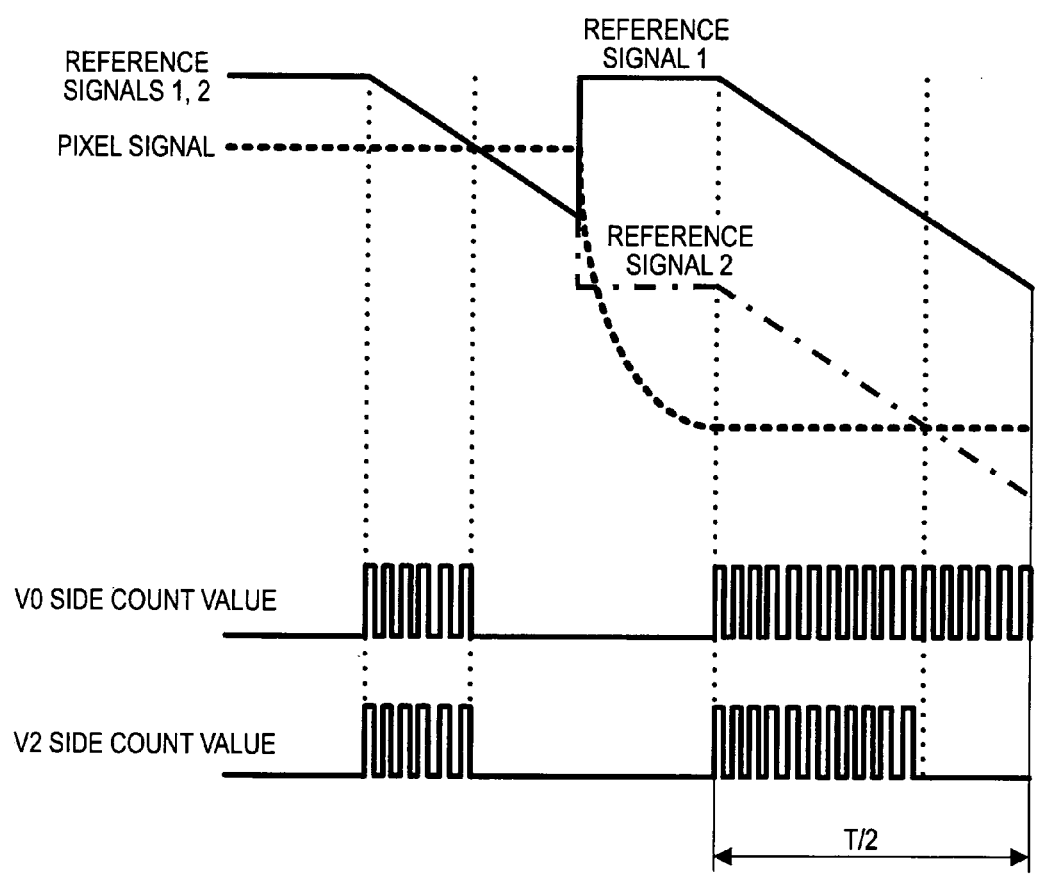
FIG. 6 is a timing waveform chart for explanation of an AD conversion operation according to working example 1.

An AD conversion operation according to working example 1 will be explained using a timing waveform chart of FIG. 6. As shown in FIG. 6, the reference signal 1 used in the working example 1 is a signal with a ramp waveform having the same gradient as that of the reference signal 1 used in the all-pixel readout mode, and the dynamic range of the reference signal 1 is ½ of the dynamic range of the reference signal 1 used in the all-pixel readout mode. Thereby, the reference signal 1 used in the working example 1 is used for the AD conversion with respect to the level equal to or lower than ½ of the maximum amplitude of the pixel signal.

On the other hand, the reference signal 2 used in the working example 1 is a signal obtained by subtracting the offset of ½ of the dynamic range of the reference signal 1 used in the all-pixel readout mode from the reference signal 1 used in the working example 1, i.e., a signal having the same gradient as that of the reference signal 1. Thereby, the reference signal 2 used in the working example 1 is used for the AD conversion with respect to the level equal to or higher than ½ of the maximum amplitude of the pixel signal.

In FIG. 5, if attention is focused on the RG pixel column V0, for example, in the horizontal thinning readout mode, the signals of the pixels of the RG pixel column V0 are input to the comparator 141 of the RG pixel column V0 and input to the comparator 141 of the RG pixel column V2 via the switch

321. In this regard, the switch 322 of the RG pixel column V0 selects the reference signal 1 and supplies it to the comparator 141 of the RG pixel column V0, and the switch 322 of the RG pixel column V2 selects the reference signal 2 and supplies it to the comparator 141 of the RG pixel column V2.

Thereby, the comparator 141 of the RG pixel column V0 starts comparison between the signals of the pixels of the RG pixel column V0 and the reference signal 1, and, in response, the counter 142 of the RG pixel column V0 starts the count operation. Here, if the signal level of the pixels of the RG pixel column V0 is within the dynamic range of the reference signal 1, when the signal level of the pixels and the reference signal 1 are equal, the counter 142 of the RG pixel column V0 stops the count operation. Then, the count value of the counter 142 is a digital value of the signals of the pixels of the RG pixel column V0. If the signal level of the pixels of the RG pixel column V0 is outside of the dynamic range of the reference signal 1, the counter 142 of the RG pixel column V0 performs the count operation to the maximum count value.

On the other hand, the comparator 141 of the RG pixel column V2 starts comparison between the signals of the pixels of the RG pixel column V0 and the reference signal 2, and, in response, the counter 142 of the RG pixel column V2 starts the count operation. Then, when the signal level of the pixels and the reference signal 2 are equal, the polarity of the output of the comparator 141 of the RG pixel column V2 is reversed and, in response, the counter 142 of the RG pixel column V2 stops the count operation.

Then, the value obtained by simply adding the count value of the counter 142 of the RG pixel column V2 to the maximum count value of the counter 142 of the RG pixel column V0 is a digital value of the signals of the pixels of the RG pixel column V0. The calculation of adding the count value is performed in an external signal processing circuit (e.g., a DSP circuit), for example.

[2-3-2. Working Example 2]

Figure 7:
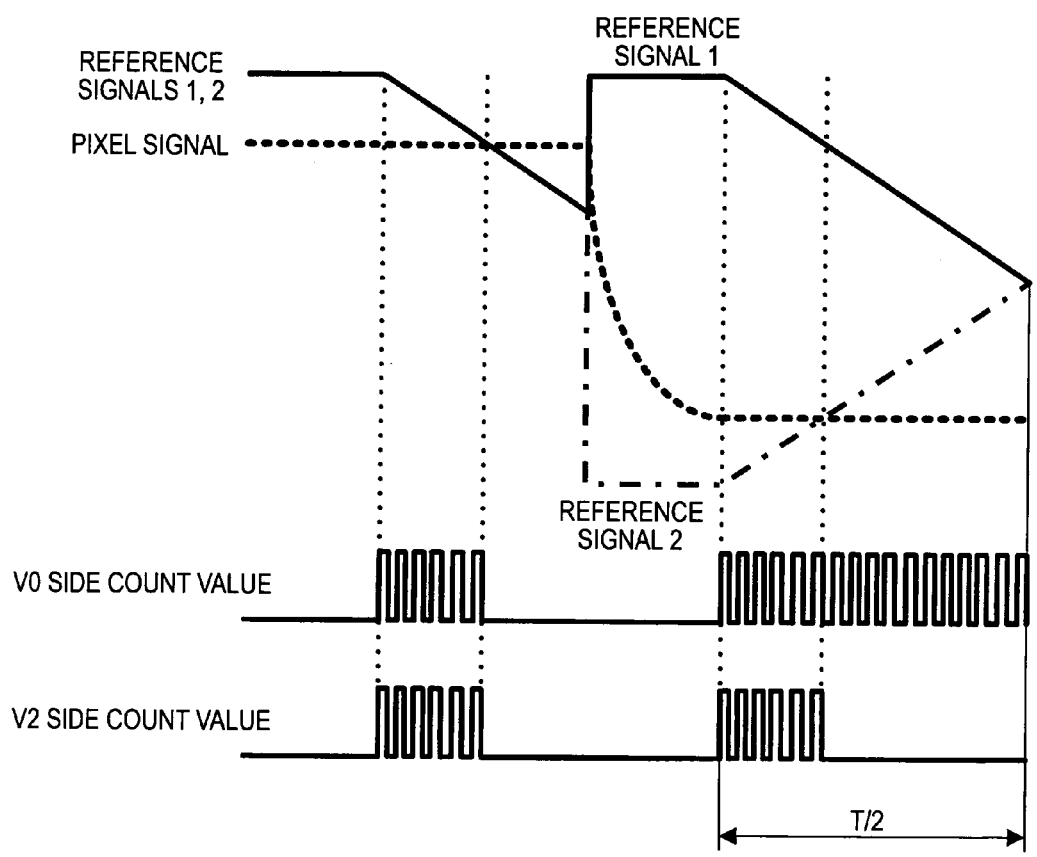
FIG. 7 is a timing waveform chart for explanation of an AD conversion operation according to working example 2.

An AD conversion operation according to working example 2 will be explained using a timing waveform chart of FIG. 7. As shown in FIG. 7, the reference signal 1 used in the working example 2 is a signal with a ramp waveform having the same gradient as that of the reference signal 1 used in the all-pixel readout mode like in the case of working example 1, and the dynamic range is ½ of the dynamic range of the reference signal 1 used in the all-pixel readout mode. Thereby, the reference signal 1 used in the working example 2 is used for the AD conversion with respect to the level equal to or lower than ½ of the maximum amplitude of the pixel signal.

On the other hand, the reference signal 2 used in the working example 2 is a signal having a gradient exactly opposite to that of the reference signal 2 used in working example 1. That is, the reference signal 2 is a signal obtained by subtracting the offset of ½ of the dynamic range of the reference signal 1 used in the all-pixel readout mode from the reference signal 1 used in the working example 2 and having the gradient exactly opposite to that of the reference signal 1. Thereby, the reference signal 2 used in the working example 2 is used for the AD conversion with respect to the level equal to or higher than ½ of the maximum amplitude of the pixel signal.

The AD conversion operation in the horizontal thinning readout mode is basically performed in the same manner as that in working example 1. Note that, given that the maximum count value of the counter 142 of the RG pixel column V2 is CNTmax and the actual count value is CNT0, (CNTmax−CNT0) corresponds to the count value of the counter 142 of the RG pixel column V2 in working example 1. This is because the reference signal 2 has the gradient exactly opposite to the gradient of the reference signal 2 used in working example 1. Therefore, in the calculation processing in the external signal processing circuit, the calculation (CNTmax−CNT0) is performed, and processing of adding the calculation result to the maximum count value of the counter 142 of the RG pixel column V0 is performed.

Alternatively, since the counter 142 is the up/down counter, the maximum count value may be set in the counter 142 of the RG pixel column V2 and down-count may be performed from the maximum count value. The final count value of the counter 142 of the RG pixel column V2 in this case is (CNTmax−CNT0). Therefore, in the calculation processing in the external signal processing circuit, in the same manner as in working example 1, the processing of simply adding the final count value of the counter 142 of the RG pixel column V2 to the maximum count value of the counter 142 of the RG pixel column V0 may be performed.

[2-4. Advantages of Embodiments]

According to the CMOS image sensor 10 according to the embodiment, by providing the horizontal thinning readout mode and reducing the pixel information in the horizontal direction by the horizontal thinning readout (to ½ in this example), the frame rate can be improved. Especially, by combining the horizontal thinning readout with known vertical thinning readout, vertical clipping, or the like and appropriately setting the thinning rate, longitudinal and lateral balance of the imaged image can be maintained.

Further, by performing parallel processing on the comparison operations in the two comparators 141, 141 using the two reference signals 1, 2, the AD conversion time can be shortened. Especially, using the signal of ½ of the dynamic range of the reference signal 1 used in the all-pixel readout mode as the reference signal 1 and compensating for the deficiency of the dynamic range, the AD conversion time, specifically, the D-phase period for AD conversion with respect to the signal level can be shortened. That is, by making the dynamic range of the reference signal 1 to ½ of that in the all-pixel readout mode, when the D-phase period in the all-pixel readout mode is T (see FIG. 4), the D-phase period can be reduced to T/2 in the horizontal thinning readout mode. Thereby, the frame rate in the horizontal thinning readout mode can be further improved.

<3. Reference Example>

As a method of improving the frame rate, a method of shortening the AD conversion time by connecting two comparators to one vertical signal line 18, inputting two kinds of reference signals 1, 2 to these comparators, respectively, and performing parallel processing using the two comparators is conceivable. A CMOS image sensor 10B employing the method will be explained as a reference example as below.

Figure 8:
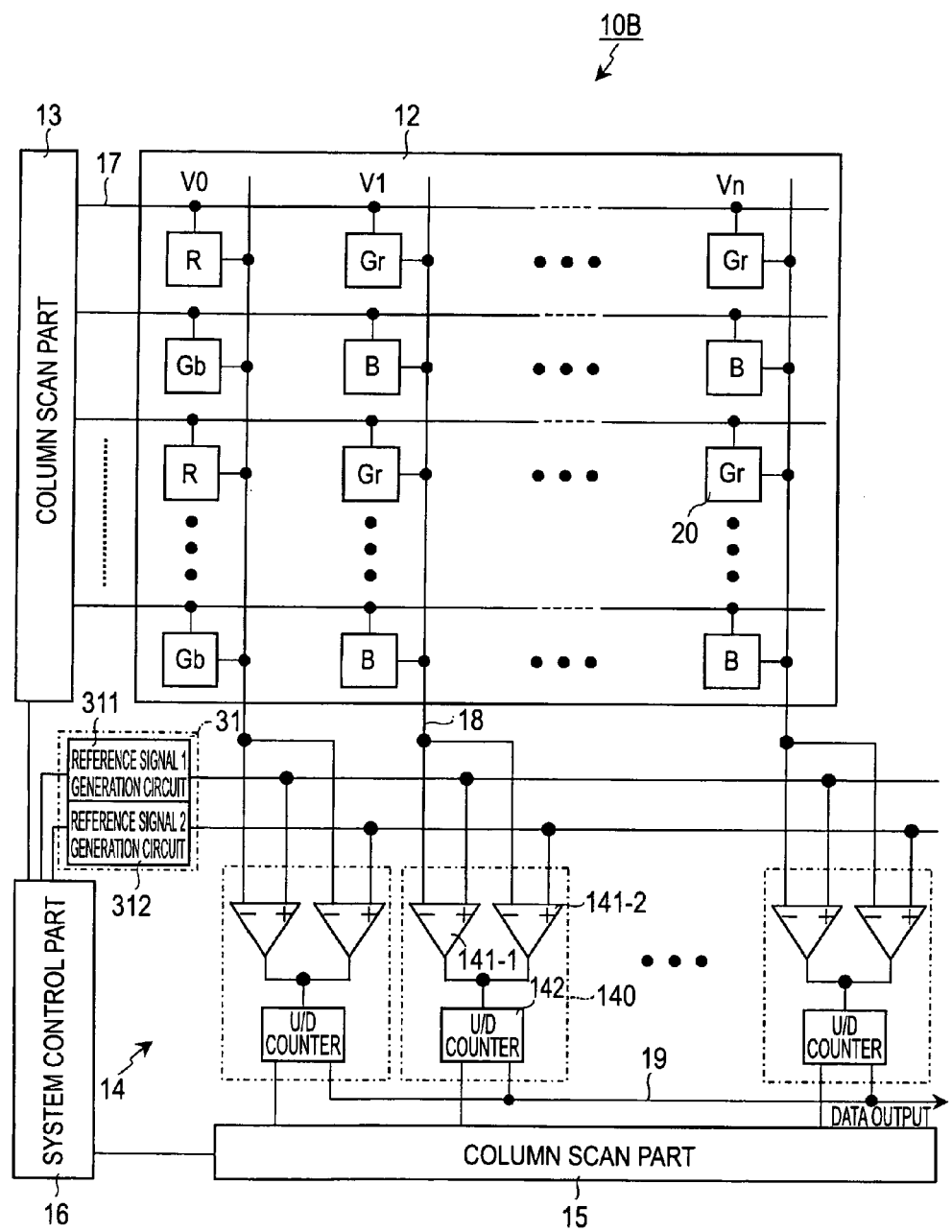
FIG. 8 is a system configuration diagram showing a schematic system configuration of a CMOS image sensor according to a reference example.

FIG. 8 is a system configuration diagram showing a schematic system configuration of the CMOS image sensor 10B according to the reference example. In FIG. 8, the same signs are assigned to equal parts (corresponding parts) to those in FIG. 3 and their overlapping detailed explanation will be omitted.

As shown in FIG. 8, in the CMOS image sensor 10B according to the reference example, the AD circuit 140 has two comparators 141-1, 141-2 for one pixel column. The two comparators 141-1, 141-2 use the analog pixel signal supplied from the unit pixels 20 through the vertical signal line 18 as inverted (−) inputs. The comparator 141-1 uses the reference signal 1 generated in the reference signal 1 generation circuit 311 as a non-inverted (+) input. The 141-2 uses the reference signal 2 generated in the reference signal 2 generation circuit 312 as a non-inverted (+) input.

The comparison results of the two comparators 141-1, 141-2 are provided to the counter 142. The counter 142 counts the comparison times of the two comparators 141-1, 141-2, and, if the polarity of the output of one of the comparators 141-1, 141-2 is first reversed, stops the count operation in response.

In the CMOS image sensor 10B having the configuration, the AD conversion time can be shortened by performing the parallel processing using the two comparators 141-1, 141-2 and the frame rate can be improved. However, the circuit size and circuit area are increased because at least two comparators 141-1, 141-2 are necessary for one pixel column.

On the other hand, according to the CMOS image sensor 10A according to the above described embodiment, the AD conversion time can be shortened by providing one comparator 141 for one pixel column and the frame rate can be improved. Therefore, the circuit size and circuit area can be reduced compared to the case using at least two comparators 141-1, 141-2 for one pixel column.

<4. Modified Examples>

In the above described embodiment, in the AD conversion circuit 140, the up/down-counter is used as the counter 142 and the noise is removed by the control of the up-count/down-count of the counter 142, however, not limited to that. That is, noise may be removed using a one-way counter as the counter 142 and calculating the count value with respect to the noise level and the count value with respect to the signal level using an external signal processing circuit (e.g., a DSP circuit).

Further, in the above described embodiment, two different reference signals 1, 2 are used as the reference signals used in the comparators, however, this is only an example and three or more different reference signals may be used. For example, in the case where three different reference signals 1, 2, 3 are used, the dynamic range of the reference signal 1 is set to ⅓ of the dynamic range of the reference signal 1 used in the all-pixel readout mode.

Then, the reference signal 2 may be obtained by subtracting the offset of ⅓ of the dynamic range from the reference signal 1 and the reference signal 3 may be obtained by further subtracting the offset of ⅓ therefrom. In this regard, comparison operations are performed in parallel using comparators 141 belonging to three pixel columns in response to the three different reference signals 1, 2, 3.

Furthermore, in the above described embodiment, the case where the invention is applied to the CMOS image sensor in which unit pixels for sensing signal charge in response to the amount of visible light as a quantitative amount are two-dimensionally arranged in a matrix has been explained as an example, however, not limited to that. That is, the invention may be applied to all solid-state image sensing devices employing the column AD conversion system.

Moreover, not limited to the application to solid-state image sensing devices for sensing the distribution of the amount of incident visible light and imaging it as an image, the invention may be applied to solid-state image sensing devices for imaging the distribution of the amount of incident infrared ray, X-rays, particles, or the like as an image. Further, in a broad sense, quantitative amount distribution sensing devices such as fingerprint detection sensors for sensing the distribution of other quantitative amounts such as pressure and electrostatic capacity and imaging it as an image may be solid-state image sensing devices.

In addition, the solid-state image sensing devices may be in the form as one chips, and in the form of modules having imaging functions in which an imaging unit and a signal processing unit or optical system are collectively packaged.

<5. Electronic Apparatus>

The solid-state image sensing device according to the embodiments of the invention may be used by being mounted on all electronic apparatus using the solid-state image sensing device for an image capture unit (photoelectric conversion unit). As an electronic apparatus, an imaging apparatus (camera system) such as a digital still camera and a video camera, a portable terminal device having a imaging function such as a cellular phone, a copy machine using the solid-state image sensing device for an image capture unit may be cited. In addition, a camera module mounted on an electronic apparatus may be the imaging apparatus.

(Imaging Apparatus)

Figure 9:
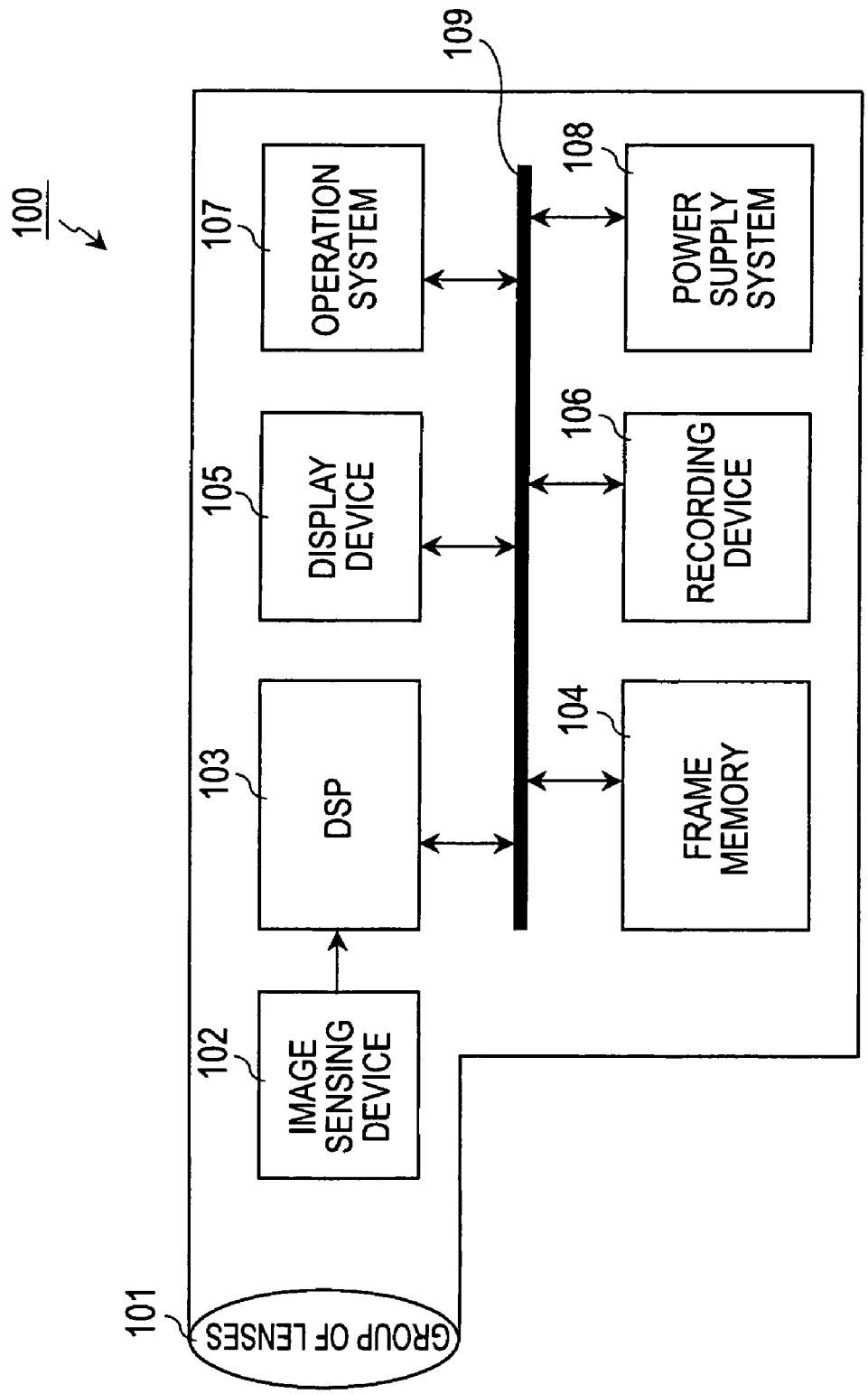
FIG. 9 is a block diagram showing an example of a configuration of an imaging apparatus as one of an electronic apparatus according to an embodiment of the invention.

FIG. 9 is a block diagram showing an example of a configuration of an imaging apparatus as one of an electronic apparatus according to an embodiment of the invention. As shown in FIG. 9, an imaging apparatus 100 according to the embodiment of the invention includes an optical system containing a group of lenses 101, an image sensing device 102, a DSP circuit 103 as a camera signal processing unit, a frame memory 104, a display device 105, a recording device 106, an operation system 107, a power supply system 108, etc. Further, the DSP circuit 103, the frame memory 104, the display device 105, the recording device 106, the operation system 107, and the power supply system 108 are mutually connected via a bus line 109.

The group of lenses 101 capture the incident light (image light) from a subject and focuses it on an imaging surface of the image sensing device 102. The image sensing device 102 converts the amount of incident light focused on the imaging surface by the group of lenses 101 into electric signals in units of pixels and outputs them as pixel signals. As the image sensing device 102, a solid-state image sensing device such as the CMOS image sensor according to the above described embodiments may be used. The DSP circuit 103 performs known camera signal processing and performs calculation processing of the count value of the counter 142 at the above described AD conversion.

The display device 105 includes a panel-type display device such as a liquid crystal display device or an organic EL (electro luminescence) display device, and displays moving images or still images imaged by the image sensing device 102. The recording device 106 records the moving images or still images imaged by the image sensing device 102 in recording media such as video tapes and DVDs (Digital Versatile Disc).

The operation system 107 issues operation commands with respect to various functions that the imaging apparatus have under the operation by the user. The power supply system 108 appropriately supply various power supplies as operation supplies of the DSP circuit 103, the frame memory 104, the display device 105, the recording device 106, and the operation system 107 to targets of supply.

The imaging apparatus 100 is applied to a video camera, a still camera, and further, a camera module for a mobile device such as a cellular phone. In the imaging apparatus 100, using the CMOS image sensor according to the above described embodiments as the image sensing device 102, the CMOS image sensor can improve the frame rate by horizontal thinning readout. As a result, high-speed imaging can be realized and longitudinal and lateral balance of the imaged image can be maintained in combination with vertical thinning readout, vertical clipping, or the like.

The present application contains subject matter related to that disclosed in Japanese Priority Patent Application JP 2009-180374 filed in the Japan Patent Office on Aug. 3, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state image sensing device comprising:
a pixel array unit in which pixels containing photoelectric conversion devices are arranged in a matrix and a vertical signal line is wired with respect to each pixel column;
an analog-digital conversion circuit provided with respect to each pixel column of the pixel array unit and having a comparator using an analog signal supplied from the pixel through the vertical signal line as a comparison target input and a counter that measures a time from start of comparison to completion of the comparison of the comparator;
a reference signal generating unit that generates plural reference signals with ramp waveforms;
a first switch that, in a thinning readout mode of reading out signals from pixels of a specific group of pixel columns of the pixel array unit to the vertical signal line, shorts the vertical signal line belonging to one pixel column of the specific group of pixel columns and the vertical signal line belonging to another group of pixel columns than the specific group of pixel columns from pixels of which no signals are readout; and
a second switch that, in the thinning readout mode, provides the plural reference signals as comparison criterion inputs to the comparator belonging to the one pixel column and the comparator belonging to the another group of pixel columns than the specific group of pixel columns, respectively.

2. The solid-state image sensing device according to claim 1, wherein the pixels of the another group of pixel columns than the specific group of pixel columns are electrically separated from the vertical signal line in the thinning readout mode.

3. The solid-state image sensing device according to claim 1, wherein, in an all-pixel readout mode of reading out signals from all pixels of the pixel array unit, the first switch is turned off, and the second switch provides a single reference signal of the plural reference signals to the comparators belonging to all pixel columns of the pixel array unit as the comparator criterion input.

4. The solid-state image sensing device according to claim 3, wherein, when the plural reference signals are two reference signals, a dynamic range of one reference signal of the two reference signals used in the thinning readout mode is ½ of a dynamic range of the single reference signal used in the all-pixel readout mode.

5. The solid-state image sensing device according to claim 4, wherein the other reference signal of the two reference signals is a signal obtained by subtracting an offset of ½ of the dynamic range of the single reference signal from the one reference signal.

6. The solid-state image sensing device according to claim 4, wherein the other reference signal of the two reference signals is a signal obtained by subtracting an offset of ½ of the dynamic range of the single reference signal from the one reference signal and having a gradient exactly opposite to that of the one reference signal.

7. An analog-digital conversion method of a solid-state image sensing device, in analog-digital conversion of a solid-state image sensing device including
a pixel array unit in which pixels containing photoelectric conversion devices are arranged in a matrix and a vertical signal line is wired with respect to each pixel column,
an analog-digital conversion circuit provided with respect to each pixel column of the pixel array unit and having a comparator using an analog signal supplied from the pixel through the vertical signal line as a comparison target input and a counter that measures a time from start of comparison to completion of the comparison of the comparator, and
a reference signal generating unit that generates plural reference signals with ramp waveforms,
the method comprising the steps of:
in a thinning readout mode of reading out signals from pixels of a specific group of pixel columns of the pixel array unit to the vertical signal line, shorting the vertical signal line belonging to one pixel column of the specific group of pixel columns and the vertical signal line belonging to another group of pixel columns than the specific group of pixel columns from pixels of which no signals are readout; and
providing the plural reference signals as comparison criterion inputs to the comparator belonging to the one pixel column and the comparator belonging to the another group of pixel columns than the specific group of pixel columns, respectively.

8. An electronic apparatus comprising a solid-state image sensing device including:
a pixel array unit in which pixels containing photoelectric conversion devices are arranged in a matrix and a vertical signal line is wired with respect to each pixel column;
an analog-digital conversion circuit provided with respect to each pixel column of the pixel array unit and having a comparator using an analog signal supplied from the pixel through the vertical signal line as a comparison target input and a counter that measures a time from start of comparison to completion of the comparison of the comparator;
a first switch that, in a thinning readout mode of reading out signals from pixels of a specific group of pixel columns of the pixel array unit to the vertical signal line, shorts the vertical signal line belonging to one pixel column of the specific group of pixel columns and the vertical signal line belonging to another group of pixel columns than the specific group of pixel columns from pixels of which no signals are readout;
a reference signal generating unit that generates plural reference signals with ramp waveforms; and
a second switch that, in the thinning readout mode, provides the plural reference signals as comparison criterion inputs to the comparator belonging to the one pixel column and the comparator belonging to the another group of pixel columns than the specific group of pixel columns, respectively.

* * * * *